United States Patent
Emmanuel

(10) Patent No.: US 6,872,932 B2
(45) Date of Patent: Mar. 29, 2005

(54) LIGHT CURTAIN

(75) Inventor: Michel Emmanuel, Rueil-Malmaison (FR)

(73) Assignee: Schneider Electric Industries SAS (FR)

(*) Notice: Subject to any disclaimer, the term of this patent is extended or adjusted under 35 U.S.C. 154(b) by 26 days.

(21) Appl. No.: 10/624,529

(22) Filed: Jul. 23, 2003

(65) Prior Publication Data

US 2005/0017157 A1 Jan. 27, 2005

(51) Int. Cl.⁷ .............................................. G08B 13/18
(52) U.S. Cl. ..................................... 250/221; 340/555
(58) Field of Search .............................. 250/221, 222.1, 250/559.2, 559.22; 340/555, 556, 557; 356/625, 628

(56) References Cited

U.S. PATENT DOCUMENTS 5,130,532 A * 7/1992 Clemens ..................... 250/221
5,266,810 A * 11/1993 Murphy .................. 250/559.24

FOREIGN PATENT DOCUMENTS

DE       1 261 025      2/1968
GB       1 561 424      2/1980

* cited by examiner

*Primary Examiner*—Kevin Pyo
(74) *Attorney, Agent, or Firm*—Parkhurst & Wendel, L.L.P.

(57) ABSTRACT

Light curtain comprising two long assemblies defining between them an area to be monitored.

Each assembly P1, P2 comprises with regard to the other assembly a striped surface of light 13 and dark areas 12 thus forming a grid. A linear or matrix receiver having a suitable optic picks up the image from the grid and the processing means of the two assemblies process the corresponding image signals to send an intrusion signal. Each assembly should preferably have two receivers RH1, RB1; RH2, RB2 near its ends and the optic associated to each receiver should cover the whole length of the opposite assembly, and the processing means should carry out a redundant processing of the images of the monitored area.

7 Claims, 2 Drawing Sheets

LIGHT CURTAIN

This invention relates to a light curtain comprising two elongated assemblies defining between them and lengthwise an area to be monitored, and comprising at least one light source, at least one optical receiver, and processing means able to process the signals received from the light source by the receiver, in order to send an intrusion signal.

Standard light curtains comprise two long assemblies, one of which has a series of optical transmitting elements and the other having a series of optical receiving elements. It would be preferable to use linear or matrix sensors of the ccd or cmos type as receiving elements, since the performance of these sensors is currently on the increase while their price is dropping, and to adapt these elements and the corresponding processing means to make them suitable for a light curtain.

The aim of the invention is to meet these requirements in a safety light curtain.

In accordance with the present invention, each assembly makes, together with its opposite assembly, a surface provided with alternating light areas and dark areas along the length of the assembly and which form a grid, and each assembly comprises at least one linear (or matrix) optical receiver with opto-sensitive points that are located in succession along the length of the assembly, and an optic associated to the linear receiver which is able to pick up the image of at least part of the length of the opposite grid; the linear receiver picks up the image of the part of the opposite grid and sends an image signal of the grid, and the processing means of the two assemblies process the grid image signals coming from their linear receiver to send the intrusion signal.

Each assembly can have a single linear receiver near one end whose associated optic covers the whole length of the opposite assembly, the optical receivers of the respective assemblies being located respectively at the opposite ends of the assemblies. For greater safety, each assembly should preferably have two linear receivers located near both ends, and the optic connected to each receiver should cover the whole length of the opposite assembly, and the processing means should include redundant security processing means dedicated to the monitored area.

The processing means of one of the two assemblies can suitably monitor the processing means of the other assembly, and the processing means of both assemblies are thus linked by a cabled or optical link assuring the transmission of the diagnostic signal from the monitored assembly towards the master assembly, and the transmission of a sync signal from the light source of an assembly with the optical receiver of the other assembly.

The features and advantages will be seen in the detailed description set out below, with reference to an embodiment of the invention given as an example and represented in the attached drawings.

Figure 1:
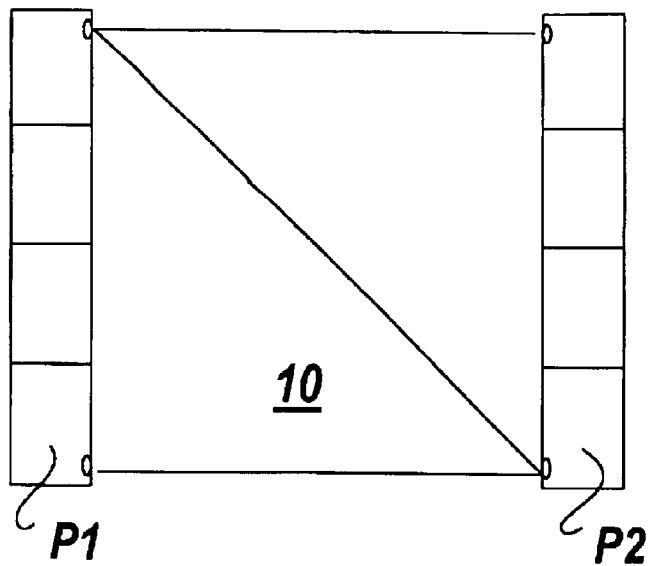
FIG. 1 is a schematic representation of a light curtain in accordance with the present invention.
Figure 2:
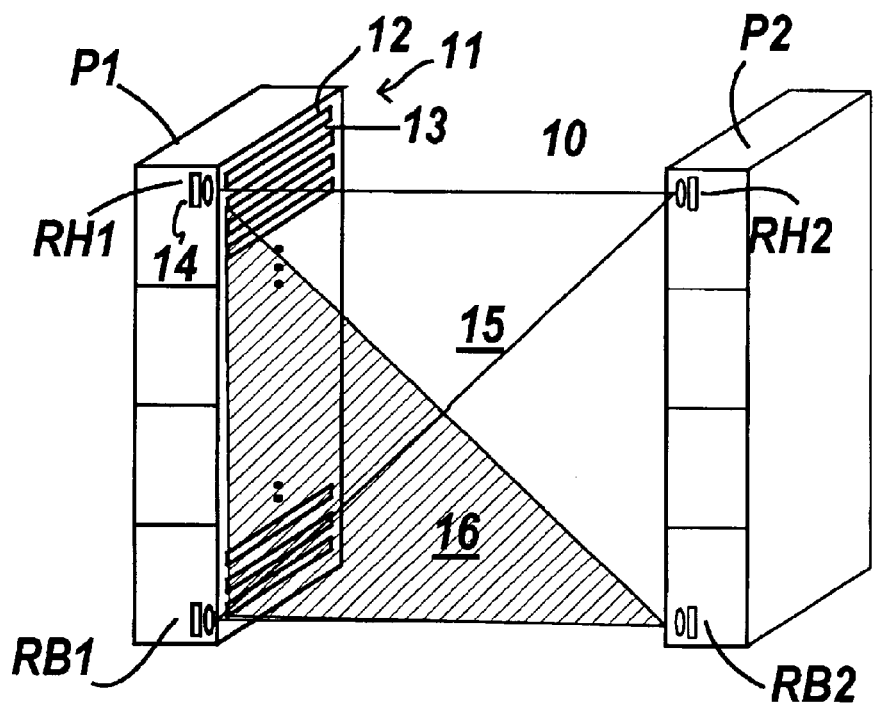
FIG. 2 shows the light curtain in perspective.

The light curtain illustrated in the figures comprises two assemblies P1,P2 arranged facing each other to cover an area 10 to be monitored. Each assembly P1, P2 comprises a housing presenting to the opposite housing a surface 11 having dark horizontal streaks or stripes 12 separated by slots 13 capable of being lit up or of allowing crossing of a transmitted light beam. The alternating stripes and slots are sized, for example with a width and pitch of 3 mm, so as to be able to detect an intruding object such as a finger, etc.

Each assembly P1, P2 also comprises two optical receivers R-marked RH1, RB1 for P1 and respectively RH2, RB2 for P2. The sensors R consist of linear or matrix sensors of the ccd, cmos or similar type. In the present text, the sensors will be referred to as linear, though properly speaking they should be linear or matrix, in order to simplify the vocabulary.

The sensors RH1, RH2 are located close to one end of the respective assembly (top end in the figures), while the sensors RB1, RB2 are located close to the other end of the assembly (bottom end in the figures). A lens or optic 14 is associated to each sensor and is able to receive a beam of a predetermined angle corresponding to the whole of the striped height of the opposite assembly. As a non restrictive example, this angle can be in the region of 15° to 60°.

The device can operate with a single receiver R per assembly, for example RH1 for P1 and RB2 for P2, each receiver thus monitoring a triangular zone 15 or 16 so that the two zones together cover all of the area 10. More than two optical receivers per assembly can also be envisaged, for example by placing receivers at the ends and also at the centre of the assembly.

Preferably however, each assembly should have two receivers as indicated, to provide redundant coverage of the area 10. This makes easier a safety processing, by the cross monitoring of the triangular areas 15,16 and 17,18, and also allows processing of the position and the size of an intruding object to be determined.

Each assembly comprises an internal light source E1, E2 that is periodically transmitted, synchronously with the activation of a receiver in the facing assembly.

Processing means comprising circuits 21,22 with added software means are connected to the respective assemblies P1, P2, particularly to control the cyclical emission of light from the light source 17,18 of an assembly P1, P2, to activate synchronously the sensor R of the opposite assembly P2, P1 and to process the image signals. To this effect, circuit 21 has two controllers 23,24 associated to the respective sensors RH1, RB1 and circuit 22 has two controllers 25,26 associated to the respective sensors RH2, RB2. The assembly P2 is monitored by the assembly P1 or "master" assembly, so that the controller 23 monitors the controller 26 and the controller 24 monitors the controller 25. The assembly P1 has a relay 27 generating an output signal S consequently to the processing and signifying a failure or an intrusion in the area 10.

Figure 3:
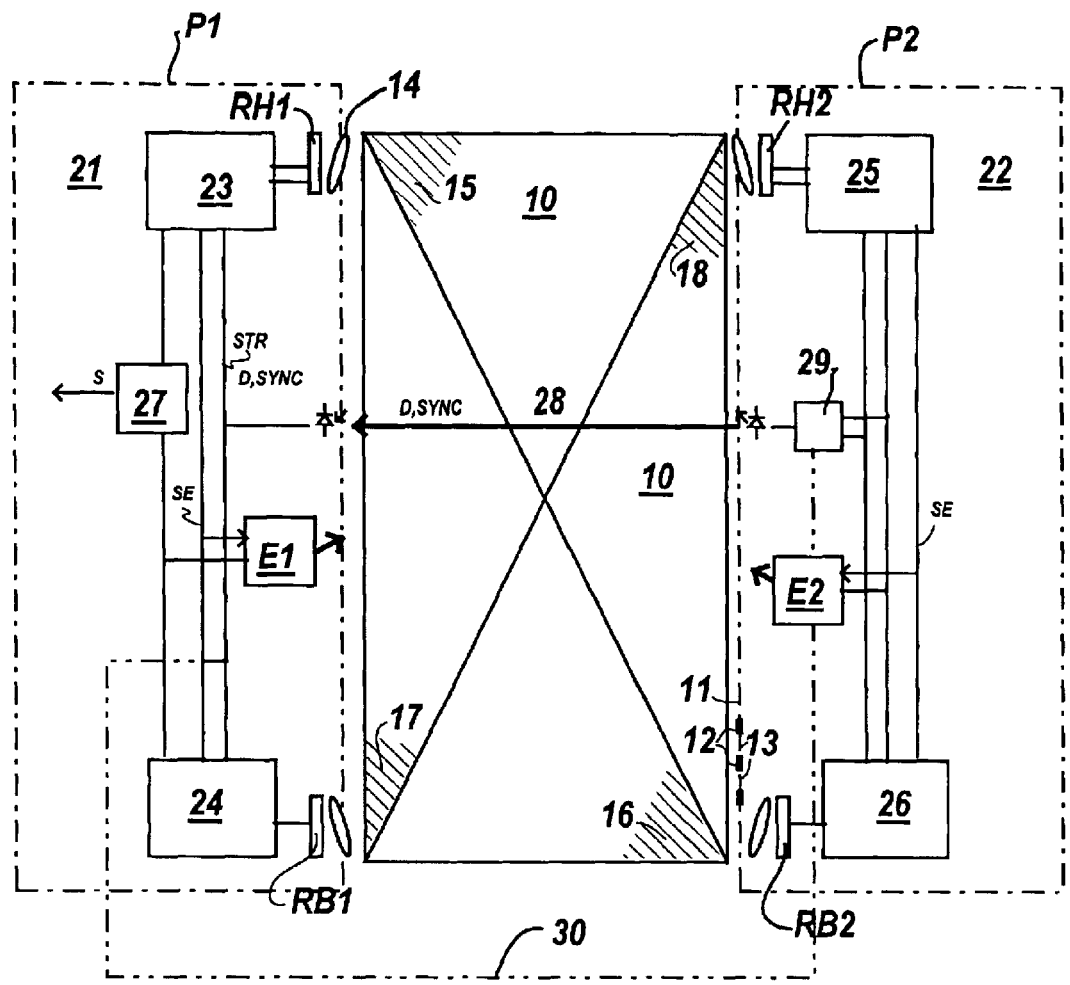
FIG. 3 shows the curtain of FIGS. 1 and 2 in greater detail.

An optical link illustrated as 28 in FIG. 3 and located outside the blind area (blanking area) ensures the transmission of diagnostic signals D, more particularly relating to the image of the monitored area, from an optical transmitting element of the assembly P2 to an optical receiving element of the assembly P1; the diagnostic signals D result from the signals provided by the controllers 25,26 and are combined by means of a logic OR 29. The link can also be a wire or cable as shown by a broken line 30. The link 28 or 30 also dispatches a synchronisation signal SYNC which synchronises the start cycle signals STR of the respective controllers and the corresponding light transmission signals SE.

What is claimed is:

1. Light curtain comprising two elongated assemblies defining between them and lengthwise an area to be monitored, and comprising at least one light source, at least one optical receiver, and processing means able to process the signals received from the light source by the receiver, in order to output an intrusion signal, characterised by the fact that each assembly (P1, P2) comprises, together with the other assembly

- a surface (11) of alternating light areas (13) and dark areas (12) distributed along the length of the assembly to form a grid,
- a linear (or matrix) optical receiver (R) with opto-sensitive points that are located in succession along the length of the assembly, and an optic (14) associated to the linear receiver (R) and adapted to pick up the image of at least part of the length of the opposite grid,
- the linear receiver (R) picks up the image of the part of the opposite grid and sends a respective grid image signal,
- the processing means (23–26) of the two assemblies (P1, P2) process the grid image signals coming from their linear receivers to output the intrusion signal (S).

2. Light curtain in accordance with claim 1, characterised by the fact that each assembly (P1, P2) has near one end a single linear receiver (23, 26), whose associated optic (14) covers the whole length of the opposite assembly (P2, P1), the optical receivers (RB2, RH1) of both assemblies being located at the respectively opposite ends of the assemblies.

3. Light curtain in accordance with claim 1, characterised by the fact that detection is cyclical, each assembly having an internal light source (E1, E2) activated periodically and synchronous with the activation of a linear receiver (R) in the opposite assembly.

4. Light curtain in accordance with claim 1, characterised by the fact that each assembly (P1, P2) has two linear receivers (RH1, RB1; RH2, RB2) located near its two ends, and the optic (14) associated to each receiver is adapted to cover the whole length of the opposite assembly (P2, P1), the processing means (21,22) including redundant safety processing means to process the image signals of the monitored area.

5. Light curtain in accordance with claim 4, characterised by the fact that the processing means (21,23,24) of one of the two assemblies (P1) monitor the processing means (22,25, 26) of the other assembly, and the processing means of the two assemblies are connected by a link (28; 30) ensuring forwarding of a diagnostic signal (D) from the monitored assembly to the monitoring assembly, and forwarding of a synchronisation signal (SYNC) from the light source (E) of an assembly to synchronize the optical receiver (R) of the other assembly.

6. Light curtain in accordance with claim 5, characterised by the fact that the link (28) is optical.

7. Light curtain in accordance with claim 5, characterised by the fact that the link (30) is cabled.

* * * * *